US008037603B2

(12) United States Patent
Fujii et al.

(10) Patent No.: US 8,037,603 B2
(45) Date of Patent: Oct. 18, 2011

(54) INK JET HEAD AND PRODUCING METHOD THEREFOR

(75) Inventors: Kenji Fujii, Kawasaki (JP); Junichi Kobayashi, Ayase (JP); Yoshinori Tagawa, Yokohama (JP); Hideo Tamura, Kawasaki (JP); Hiroyuki Murayama, Kawasaki (JP); Keiji Watanabe, Kawasaki (JP); Taichi Yonemoto, Isehara (JP); Isamu Horiuchi, Kawasaki (JP); Aya Yoshihira, Yokohama (JP); Masamichi Yoshinari, Tokyo (JP); Jun Kawai, Tokyo (JP); Tamaki Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1181 days.

(21) Appl. No.: 11/738,782

(22) Filed: Apr. 23, 2007

(65) Prior Publication Data

US 2007/0252872 A1 Nov. 1, 2007

(30) Foreign Application Priority Data

Apr. 27, 2006 (JP) ................................ 2006-123736
Jun. 8, 2006 (JP) ................................ 2006-160069
Jun. 15, 2006 (JP) ................................ 2006-166002

(51) Int. Cl.

| | |
|---|---|
| ***B21D 53/76*** | (2006.01) |
| ***B23P 17/00*** | (2006.01) |
| ***B41J 2/015*** | (2006.01) |
| ***B41J 2/15*** | (2006.01) |
| ***B41J 2/145*** | (2006.01) |
| ***B41J 2/135*** | (2006.01) |

(52) U.S. Cl. .............. 29/890.1; 347/20; 347/40; 347/44

(58) Field of Classification Search ................ 29/890.1; 347/20, 40, 44

See application file for complete search history.

(56) References Cited

U.S. PATENT DOCUMENTS

| | | | | |
|---|---|---|---|---|
| 5,758,417 | A * | 6/1998 | Kobayashi et al. | 29/890.1 |
| 6,016,601 | A * | 1/2000 | Takemoto et al. | 29/890.1 |
| 6,074,543 | A * | 6/2000 | Yoshihira et al. | 205/75 |
| 6,164,759 | A * | 12/2000 | Fujii et al. | 347/54 |
| 6,231,166 | B1 * | 5/2001 | Kawai et al. | 347/63 |
| 6,390,606 | B1 * | 5/2002 | Terui et al. | 347/63 |
| 6,830,317 | B2 | 12/2004 | Tsuchii et al. | |
| 7,287,847 | B2 * | 10/2007 | Fujii et al. | 347/93 |
| 7,300,596 | B2 * | 11/2007 | Murayama et al. | 216/27 |
| 7,389,585 | B2 * | 6/2008 | Sato et al. | 29/890.1 |
| 2006/0125884 | A1 * | 6/2006 | Sato et al. | 347/65 |
| 2007/0178248 | A1 * | 8/2007 | Ohsumi et al. | 427/555 |
| 2007/0207414 | A1 | 9/2007 | Murayama et al. | |

* cited by examiner

*Primary Examiner* — A. Dexter Tugbang
*Assistant Examiner* — David Angwin
(74) *Attorney, Agent, or Firm* — Fitzpatrick, Cella, Harper & Scinto

(57) ABSTRACT

An ink jet head producing method includes forming a first flow path forming member in a portion constituting a flow path side wall, which constitutes at least a partitioning portion between flow paths on a substrate; forming a pattern as a mold for the flow path, the pattern being formed over the substrate and a portion of the first flow path forming member; forming a second flow path forming member on the first flow path forming member and the pattern, the second flow path forming member being formed of a material corresponding to the first flow path forming member; forming the discharge port in the second flow path forming member; and forming the flow path by removing the pattern.

10 Claims, 12 Drawing Sheets

INK JET HEAD AND PRODUCING METHOD THEREFOR

BACKGROUND OF THE INVENTION

1. Field of the Invention

The present invention relates to an ink jet head for recording on various recording media, such as paper, yarns, fibers, textile, leather, metal, plastics, glass, timber and ceramics. The term “recording” above means providing a recording medium with not only a meaningful image such as a character or a graphic image, but also a meaningless image such as a pattern.

2. Description of the Related Art

As an ordinary ink jet head, there will be described an ink jet head in which the ink discharge is executed perpendicularly to the plane of an energy generating element for generating energy to be utilized for ink discharge. In recent years, in order to meet the requirement for compactification and higher density, an ink jet head is proposed in a structure of incorporating an electric control circuit, for driving the energy generating element, in a substrate utilizing the semiconductor manufacturing technology. In the aforementioned ink jet head of high performance, the compactification and the high image quality are accomplished by forming a common ink supply opening penetrating through the substrate from the rear surface thereof, and arranging a plurality of nozzles (discharge ports and flow paths communicating thereto) on both sides of the opening in the substrate. Such ink jet head of high performance is already commercialized up to a nozzle array density of 600 dpi, on one side of the opening.

However, a further increase in the nozzle array density requires a high investment in the manufacturing apparatus for forming a high-definition pattern. Therefore proposed is a structure of maintaining the nozzle array density at 600 dpi but displacing the nozzle positions (positions of discharge ports) on both sides of the common ink supply opening by half a pitch, with respect to each other. In this manner, the practical nozzle density at recording is doubled to 1200 dpi, thereby achieving a higher image quality in the recorded image. Such structure is disclosed in U.S. Pat. No. 6,830,317.

Also U.S. Pat. No. 6,390,606 discloses a process of forming a flow path, by forming a mold pattern for the flow path, then covering it with a resin constituting a flow path forming member, and then removing the mold. Also this patent discloses, in relation to the adhesivity between the substrate and the nozzle layer, to provide a polyether amide resin as an adhesion layer between the substrate and the nozzle layer.

However, in order to attain an even higher image quality in the image recorded by the recording head, further technical developments are necessary for realizing a higher density in the nozzle array while minimizing the investment.

The aforementioned process disclosed in U.S. Pat. No. 6,390,606 has a certain limitation in the patterning precision of the mold material for the flow path pattern in case of the conventionally utilized materials, but is capable of forming satisfactory flow path wall 106 as illustrated in FIGS. 6A, 6B, 6C, 6D, 6E, 6F, 6G and 6H, up to the conventional nozzle density (600 dpi). In this case, the flow path wall 106 has an aspect ratio (ratio of height and width) of 4:3. However, when the nozzle density is increased to 1200 dpi, the mold material, formed by a photosensitive material, shows a deficiency in resolution, whereby the flow path wall 106 cannot be satisfactorily formed. For example, when a gap is formed between the end portion of the flow path wall 106 and the adhesion layer 107 as illustrated in FIG. 8, the adjacent flow paths are mutually connected to generate a crosstalk, whereby the ink cannot be discharged in a satisfactory manner.

In order to solve such limitation, it is conceivable to change the mold material to a material of a higher resolution. However, such material of a higher resolution is difficult to develop within a short period. As another method, it is conceivable to reduce the thickness of the mold material. However, in the case that the nozzle density is increased to 1200 dpi, the width of each flow path becomes smaller, thus being liable to cause a deficient ink refill to the discharge port. Therefore, in order to secure the cross section of each flow path and to prevent such deficient refill, it is necessary to increase the height of each flow path. Therefore, it is impractical to reduce the thickness of the mold material. Therefore, the two methods mentioned above are incapable of solving the problems which result when the nozzle density is increased.

SUMMARY OF THE INVENTION

In consideration of the foregoing, an object of the present invention is to provide a producing method for an ink jet head, having an improved nozzle density and capable of satisfactorily discharging the ink.

The aforementioned object can be accomplished by a following producing method for an ink jet head, constituting an aspect of the present invention.

An aspect of the present invention provides a producing method for an ink jet head including plural discharge ports for discharging ink and plural flow paths communicating with the discharge ports, the producing method comprising: forming a first flow path forming member in a portion constituting a flow path side wall, which constitutes at least a partitioning portion between plural flow paths on a substrate; forming a pattern as a mold for the flow path, wherein the pattern is formed over the substrate and a portion of the first flow path forming member, constituting a flow path side wall, and the portion constituting the flow path side wall is covered with the pattern and another portion constituting the flow path side wall is not covered with the pattern; forming a second flow path forming member on the first flow path forming member and the pattern, wherein the second flow path forming member is formed by a material corresponding to the first flow path forming member; forming the discharge port in the second flow path forming member; and forming the flow path by removing the pattern.

Further features of the present invention will become apparent from the following description of exemplary embodiments with reference to the attached drawings.

BRIEF DESCRIPTION OF THE DRAWINGS

FIGS. 3A, 3B, 3C, 3D, 3E, 3F, 3G and 3H are schematic cross-sectional views illustrating an example of the producing method for ink jet head of the present invention.

DESCRIPTION OF THE EMBODIMENTS

In the following, the producing method for ink jet head of the present invention will be described with reference to the accompanying drawings. In the following description, structures of equivalent functions may be represented by like numbers and may not be described in repetition.

Figure 1:
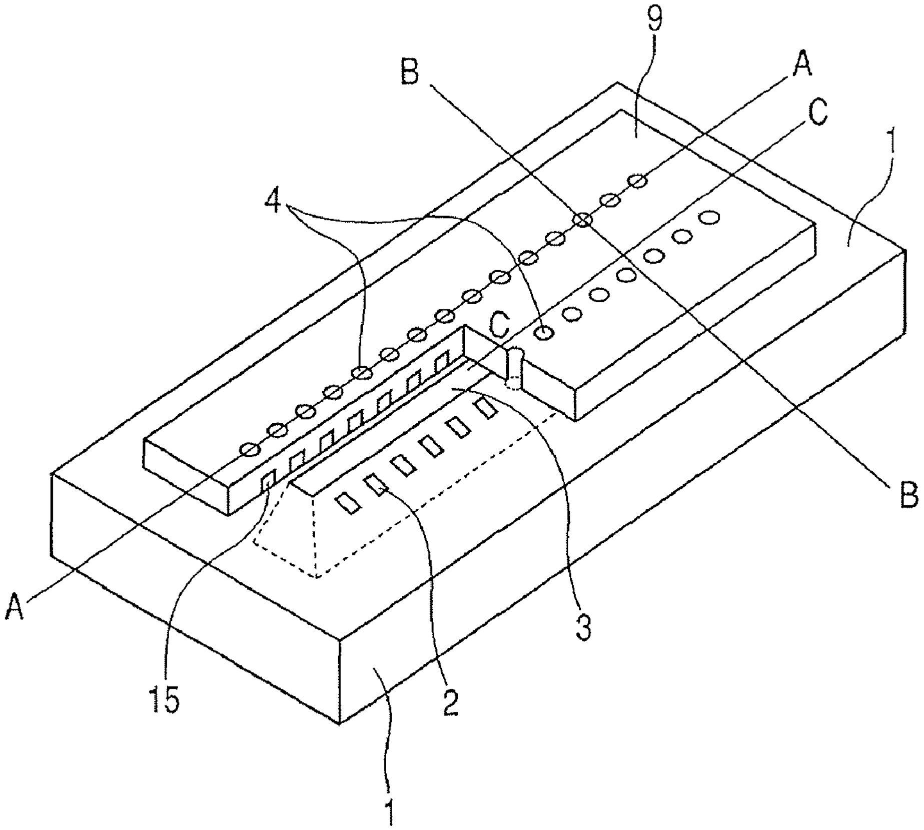
FIG. 1 is a schematic perspective view of an ink jet head of the present invention.

FIG. 1 is a schematic perspective view of an ink jet head, constituting a first exemplary embodiment of the present invention. The ink jet recording head of the present exemplary embodiment includes a silicon substrate 1, on which energy generating elements 2, for generating energy to be used for ink discharge, are formed with a predetermined pitch in two arrays. In the substrate 1, an ink supply opening 3, which is used in common for the nozzles, is opened between the two arrays of the energy generating elements 2. A flow path forming member 9, used for forming a flow path on the silicon substrate 1, includes a discharge port 4 opened above each energy generating element 2, and a flow path communicating from the ink supply opening 3 to each discharge port 4.

Such ink jet head is so positioned that a surface bearing the supply opening 3 is opposite to the recording surface of the recording medium. The ink filled in the flow path through the supply opening 3 is given a pressure generated by the energy generating element 2, whereby the droplet of ink liquid is discharged from the discharge port 4 and is deposited onto the recording medium thereby achieving a recording.

“Ink” or “liquid” is to be interpreted broadly, and is to mean a liquid that is used, by being deposited onto the recording medium, for forming an image, a pattern and the like, for working on the recording medium, or for processing the ink or the recording medium. The processing of the ink or the recording medium includes, for example, an improvement in the fixing property, an improvement in the recording quality or the color developing property, or an improvement in the durability of the image, by agglomeration or insolubilization of a colorant in the ink to be deposited onto the recording medium.

Figure 2:
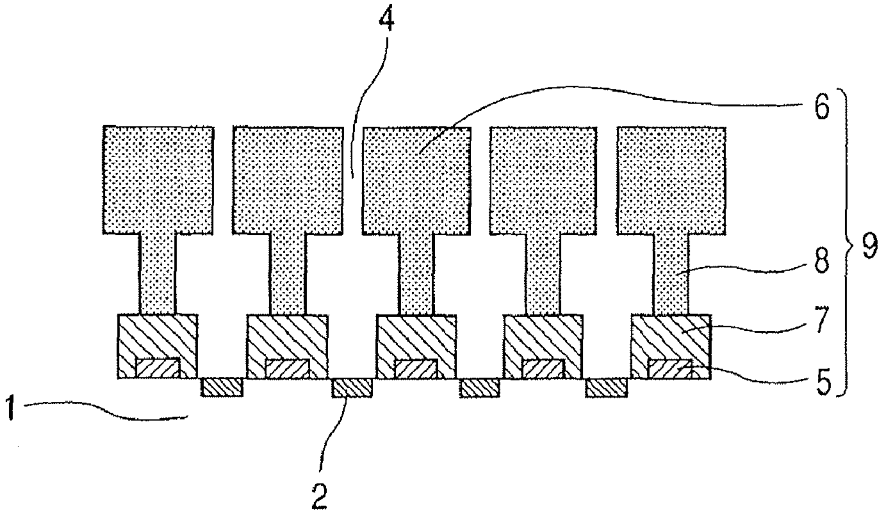
FIG. 2 is a schematic cross-sectional view illustrating the structure of the ink jet head of the present invention.

FIG. 2 is a partial cross-sectional view along a line A-A in FIG. 1. In the ink jet head of the present exemplary embodiment, an adhesion layer 5 is patterned on the substrate 1. A polyether amide resin is employed as the material for the adhesion layer 5. More specifically, the present exemplary embodiment employed HIMAL-1200 (trade name) manufactured by Hitachi Chemical Co., and the adhesion layer 5 had a thickness of 2 μm.

On the adhesion layer 5, provided is a first flow path forming member 6, subjected to a predetermined patterning, as a side wall of the flow path. The first flow path forming member 6 is provided in a position where the resolving power becomes deficient in a mold material, to be employed in the producing process to be described later. More specifically, in the present exemplary embodiment, the resolving power becomes deficient in a lower portion of a flow path wall 8, which constitutes a partitioning part of the flow path forming member between the adjacent flow paths. Therefore the first flow path forming member 6 is provided in the lower portion of the flow path wall 8. In the present exemplary embodiment, after the lower portion of the flow path wall 8 is formed by the first flow path forming member 6, the remaining part of the flow path forming member 9 is formed by a second flow path forming member 7. The first flow path forming member 6 may have a thickness within a range of from 5 to 14 μm. A lower limit of the thickness is determined by a value, calculated from a resolvable aspect ratio of a pattern, which serves as a flow path mold material to be described later. On the other hand, an upper limit of the thickness can be basically made as large as the height of the flow path wall, but is preferably made lower in consideration of the flatness in coating the mold material. In consideration of the foregoing, the thickness of the layer of the first flow path forming member 6 was selected as 5 μm. Also the material of the first flow path forming member 6 may be different from that of the second flow path forming member 7, but it is necessary to select a material having an ink resistance and having an adhesivity to the adhesion layer 5 and the second flow path forming member 7.

By forming the first flow path forming member 6 with a thickness of 5 μm, the height of the flow path wall 8 to be formed in a next step becomes correspondingly lower. Therefore, even though the resolvable aspect ratio of the resin layer for forming the pattern 14, serving as the mold material, remains as 4:3, the remaining first flow path forming member 6 can be formed with a smaller width dimension. Also the first flow path forming member 6 is so formed as to cover the adhesion layer 5, namely so as to surround the side faces of the adhesion layer 5, the first flow path forming member 6 can secure a large adhesion area to the adhesion layer 5. Therefore, the first flow path forming member 6 and the second flow path forming member 7 are made less liable to be peeled from the silicon substrate 1. In the present exemplary embodiment, the resin layer constituting the pattern 14 was formed by a solvent-soluble resin (ODUR manufactured by Tokyo Ohka Co.), with a thickness of 16 μm. However, the portion of the pattern 14 formed on the adhesion layer 5 has a thickness of 14 μm, by subtracting the thickness of 2 μm of the adhesion layer 5.

On the first flow path forming member 6, the second flow path forming member 7 is formed with a predetermined patterning. In the present exemplary embodiment, the second flow path forming member 7 was formed with a thickness of 21 μm, so that the total thickness of the first flow path forming member 6 and the second flow path forming member 7 was 26 μm.

Whether the flow path forming member 9 has a two-layered structure formed by the first flow path forming member 6 and the second flow path forming member 7 can be verified by a component analysis, when the first flow path forming member 6 and the second flow path forming member 7 are formed by different materials. Also, in the patterning steps of the members 6 and 7, because of an alignment error in the exposure apparatus, an alignment error is generated between the first flow path forming member 6 and the second flow path forming member 7. Therefore, even when the first flow path forming member 6 and the second flow path forming member 7 are formed by a same material, the presence of a two-layered structure can be easily verified for example by an electron microscope.

The dimensions described above are merely an example, and do not limit at all the claims of the present invention.

FIGS. 3A, 3B, 3C, 3D, 3E, 3F, 3G and 3H are schematic cross-sectional views illustrating the producing process of the ink jet recording head of the present exemplary embodiment. Each of FIGS. 3A, 3B, 3C, 3D, 3E, 3F, 3G and 3H corresponds to a cross-section along a line B-B in FIG. 1. Also each of FIGS. 4A, 4B, 4C, 4D, 4E and 4F corresponds to a cross-section along a line A-A in FIG. 1.

Figure 3B:
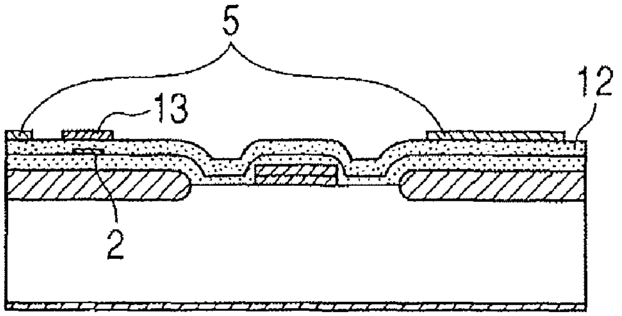
Figure 4A:
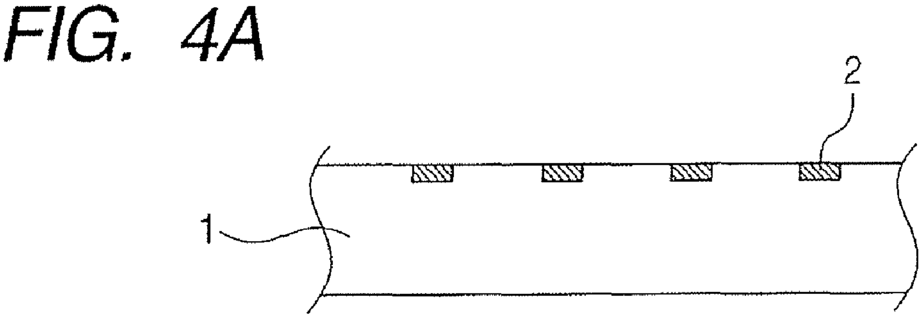
FIGS. 4A, 4B, 4C, 4D, 4E and 4F are schematic cross-sectional views illustrating an example of the producing method for the ink jet head of the present invention.

A silicon substrate 1, illustrated in FIGS. 3A and 4A, has a crystal orientation plane of <100>. The present exemplary embodiment describes a case of utilizing a silicon substrate 1 having such crystal orientation plane, but the present invention is not limited thereto. On the silicon substrate 1, a thermal oxide film 10 is formed, and a silicon oxide film 11, which is an insulating layer, is formed thereon (not illustrated in FIGS. 4A, 4B, 4C, 4D, 4E and 4F). On the silicon oxide film 11, an energy generating element 2, such as a heat-generating resistor, is provided in plural units.

Figure 4B:
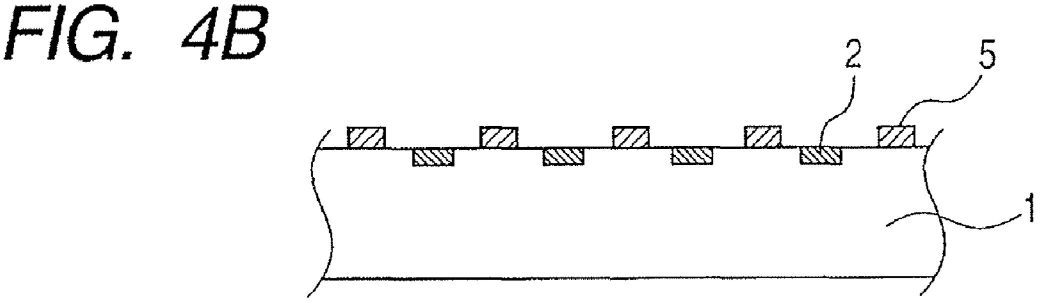

Then, as illustrated in FIGS. 3B and 4B, a silicon nitride film 12, functioning as a protective film for the energy generating element 2 and an electrical signal circuit, is formed on the substrate 1. Then a tantalum film 13 as an anticavitation film is patterned in a predetermined position (for example, above the element 2). Subsequently, an adhesion layer 5 is formed on the silicon nitride film 12 and is subjected to a predetermined patterning. The adhesion layer 5 in the present exemplary embodiment is formed by a polyether amide resin, which is a thermoplastic resin. The adhesion layer 5 has a function of improving the adhesivity between a flow path forming member 9 (to be described later) and the substrate. The polyether amide resin constituting the adhesion layer 5 may be coated on the substrate 1, for example, by spin coating, and may be patterned utilizing a positive resist (not illustrated).

Figure 3C:
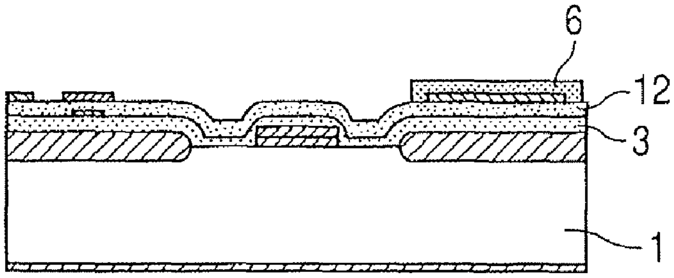
Figure 4C:
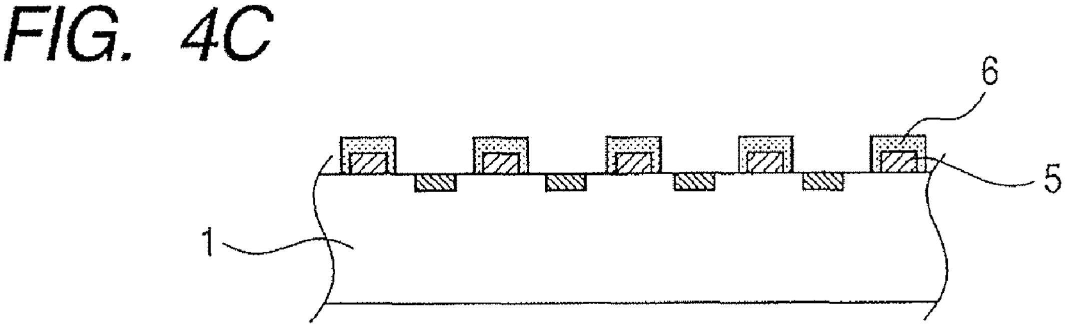

Then, as illustrated in FIGS. 3C and 4C, a first flow path forming member 6 is patterned in a portion where the resolving power of the mold member becomes deficient in a subsequent exposure step (in the present exemplary embodiment, a lower portion of the flow path wall 8). In the present exemplary embodiment, the first flow path forming member 6 is formed in a position partitioning the plural flow paths. Thus at least the first flow path forming member 6 functions as a side wall of a flow path 15. The patterning of the first flow path forming member 6 is executed by coating a photosensitive resin for example by a spin coating, followed by an exposure with an ultraviolet light or a deep UV light and a development.

Figure 3D:
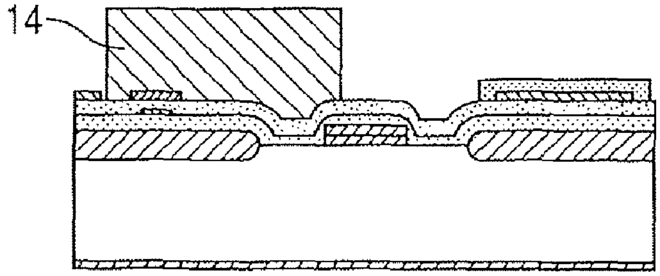
Figure 4D:
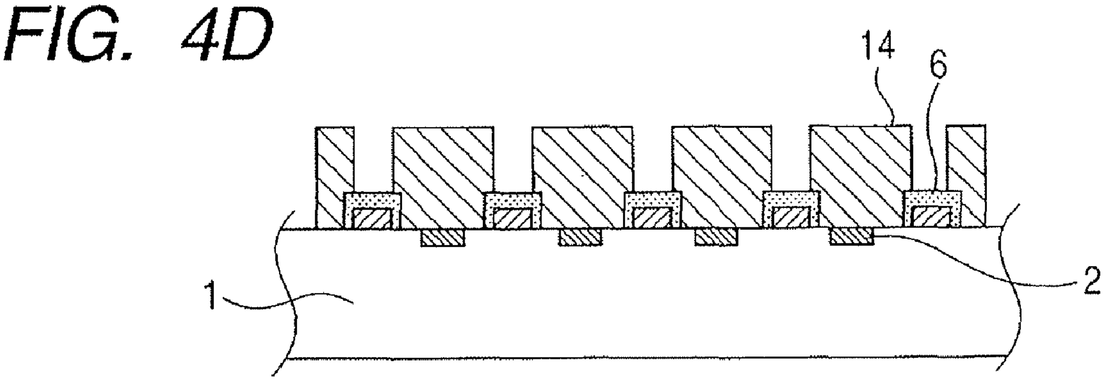

Then, as illustrated in FIGS. 3D and 4D, in an area including the energy generating element 2 on the substrate 1, a pattern 14 serving as a mold for the ink flow path is formed with a solvent-soluble photosensitive resin. The solvent-soluble resin is for example ODUR manufactured by Tokyo Ohka Co. The resin layer 14 can be patterned by coating such resin for example by a spin coating, following by an exposure with an ultraviolet light or a deep UV light and a development.

Figure 3E:
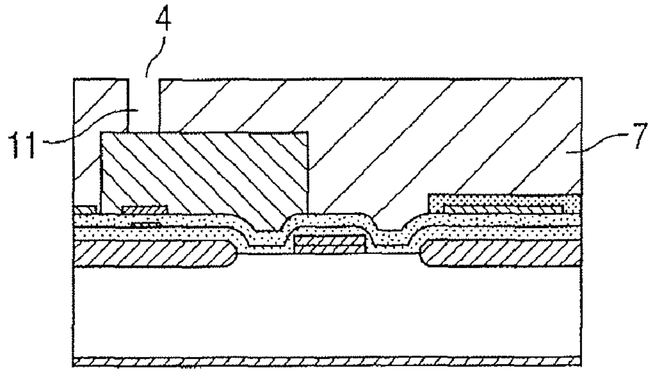
Figure 4E:
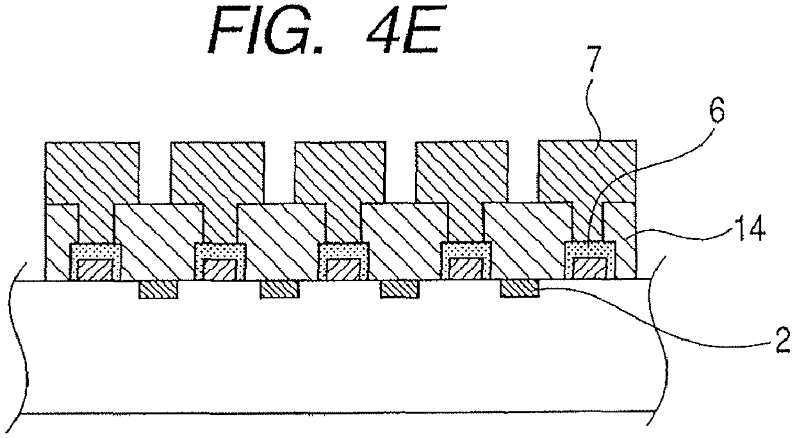

Then, as illustrated in FIGS. 3E and 4E, a second flow path forming member 7 of a photosensitive resin is formed for example by a spin coating, on the substrate 1, the pattern 14 and the first flow path forming member 6. Then the second flow path forming member 7 is subjected to an exposure with an ultraviolet light or a deep UV light and a development to form a discharge port 4.

Figure 3F:
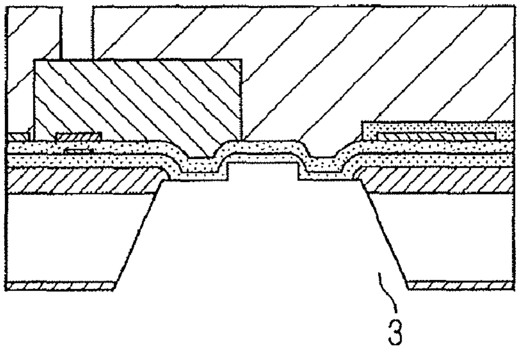

Then, as illustrated in FIG. 3F, the thermal oxide film 11 on the back side of the silicon substrate 1 is patterned to expose a surface of the substrate 1, serving as a starting surface for an anisotropic etching, and an anisotropic etching is executed to form a common ink supply opening 3 in the substrate 1. The common ink supply opening 3 is formed by subjecting the substrate 1 to a chemical etching, for example an anisotropic etching with a strong alkali solution such as of TMAH or KOH.

Figure 3G:
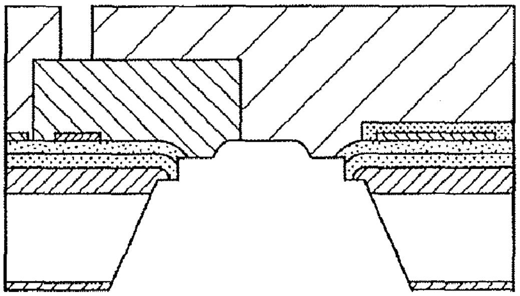

Then, as illustrated in FIG. 3G, the silicon oxide film 11 is removed by a wet etching with a hydrofluoric acid solution. Thereafter, the silicon nitride film 12 is removed for example by a dry etching.

Figure 3H:
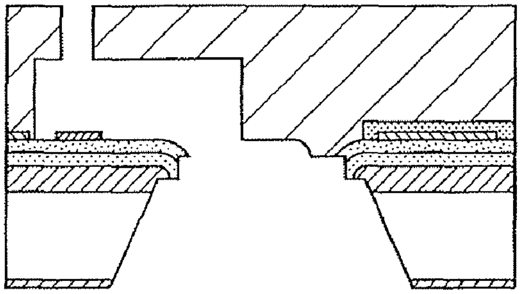
Figure 4F:
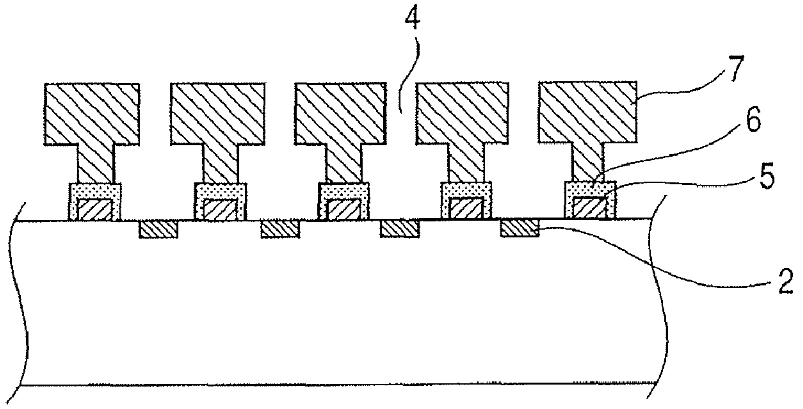

Finally, as illustrated in FIGS. 3H and 4F, the pattern 14 is dissolved out through the discharge port 4 and the ink supply opening 3. In this manner, a nozzle portion including an ink flow path and an energy generating portion, in which the energy generating element applies energy to the ink, is formed within the flow path forming members 6, 7. In this process, the removal of the pattern 14 can be executed promptly and satisfactorily, by an ultrasonic immersion of the substrate 1 in a solvent.

Through the above-described process, the substrate 1 bearing the nozzle portion is completed. Then the substrate 1 is cut into individual chips, for example, with a dicing saw. In each chip, electric wirings are bonded to the energy generating element 3 for ink discharge, and an chip tank member for ink supply is adjoined to complete an ink jet recording head.

In the present exemplary embodiment, as described above, the first flow path forming member 6 is provided in a portion where the resolving power becomes deficient in the resin constituting the pattern 14, thereby forming the lower portion of the flow path wall 8. As the first flow path forming member 6 can be formed utilizing a producing apparatus same as that for forming the second flow path forming member 7, the first flow path forming member 6 can be provided without a significant cost increase in the producing apparatus. Since the presence of the first flow path forming member 6 decreases the remaining height of the flow path wall 8, the flow path wall 8 can be made thinner without an increase in the resolving power of the pattern 14. Therefore, for example when the pattern 14 has a thickness of 14 μm, the flow path wall 8 can be formed with a width of 7 μm. Therefore the nozzle density at one side of the common ink supply opening 3 can be increased from the conventional 600 dpi to 1200 dpi, thus enabling a significant improvement in the image quality recorded by the recording head. Also a cost reduction by a size reduction of the substrate 1, incorporating the electrical control circuit, is possible in the future.

Second Exemplary Embodiment

Figure 5:
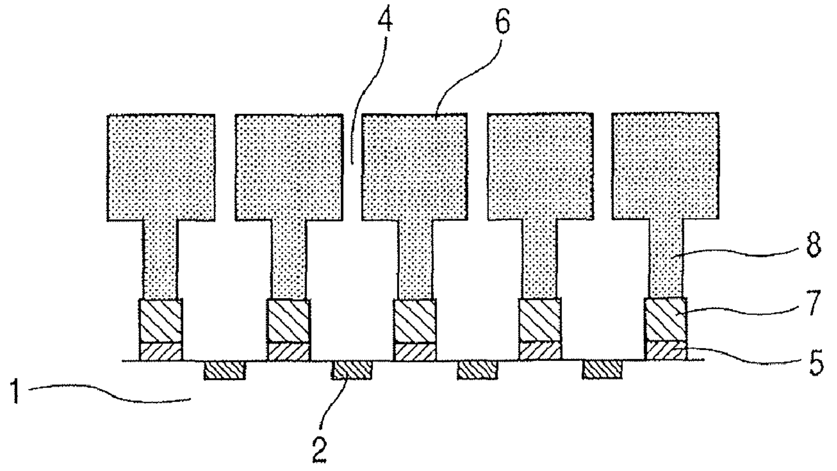
FIG. 5 is a schematic cross-sectional view illustrating the structure of an example of the ink jet head of the present invention.

FIG. 5 is a partial cross-sectional view of an ink jet recording head, in a second exemplary embodiment of the present invention.

In the ink jet recording head of the present exemplary embodiment, as in the first embodiment described above, the adhesion layer 5 is patterned on the substrate 1. The adhesion layer 5 is formed by a polyether amide resin as a material thereof. However, the adhesion layer 5 in the present exemplary embodiment has a width and a length same as those of the first flow path forming member 6 formed thereon. Other structures of the second exemplary embodiment are same as those in the first exemplary embodiment, and will not therefore be explained further.

FIGS. 6A, 6B, 6C, 6D, 6E, 6F, 6G and 6H are schematic cross-sectional views illustrating a producing process of the ink jet head of the present exemplary embodiment. In the following, described only are steps different from the producing steps of the ink jet head in the first exemplary embodiment, and the description will be omitted for the steps executed in the same manner as in the first exemplary embodiment.

Figure 6A:
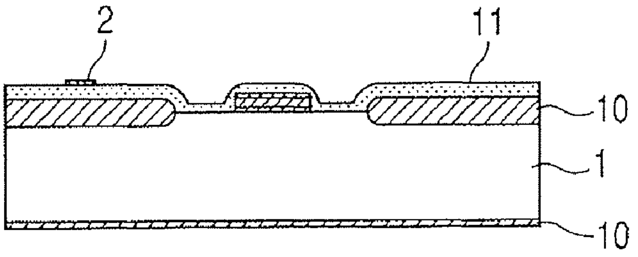
FIGS. 6A, 6B, 6C, 6D, 6E, 6F, 6G and 6H are schematic cross-sectional views illustrating an example of the producing method for ink jet head of the present invention.
Figure 6B:
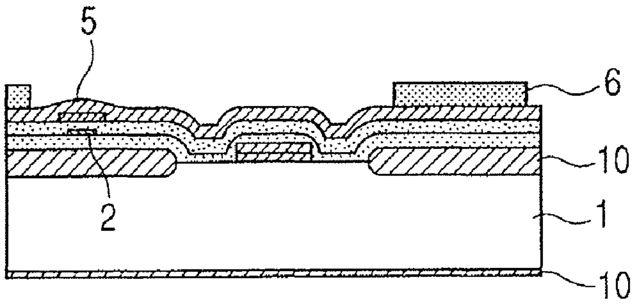

In the present exemplary embodiment, in a step illustrated in FIG. 6B, a silicon nitride film 12, functioning as a protective film for the energy generating element 2 and the electric signal circuit, is formed on the silicon substrate 1. Thereafter, a tantalum film 13 as an anticavitation film is patterned in predetermined position (for example above the element 2).

Then an adhesion layer 5 is formed on the silicon nitride film 12. The adhesion layer 5 is formed by a polyether amide resin, which is a thermoplastic resin. The adhesion layer 5 has a function of improving the adhesivity with a nozzle layer 9 to be described later. The polyether amide resin, constituting the adhesion layer 5, may be coated on the silicon substrate 1, for example by a spin coating.

Then, a first flow path forming member 6 is patterned in a portion on the adhesion layer 5 where the resolving power of the mold member becomes deficient in a subsequent exposure step (in the present exemplary embodiment, principally a lower portion of the flow path wall 8). The patterning of the first flow path forming member 6 is executed by coating a photosensitive resin for example by a spin coating, followed by an exposure with an ultraviolet light or a deep UV light and a development.

Figure 6C:
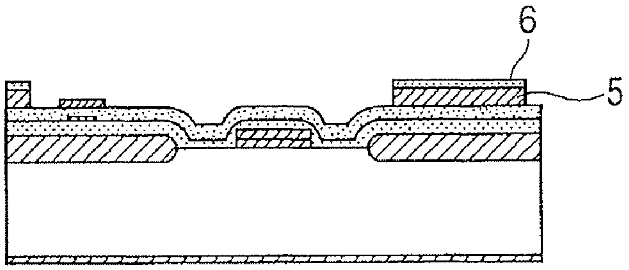
Figure 6D:
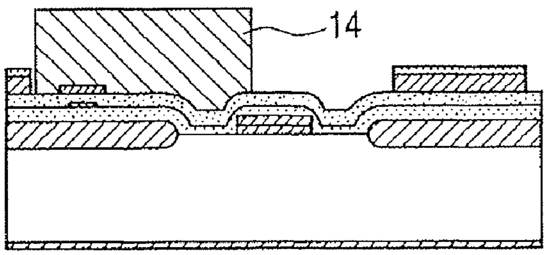
Figure 6E:
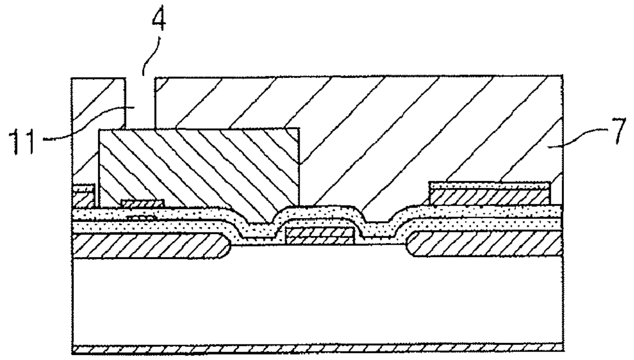
Figure 6F:
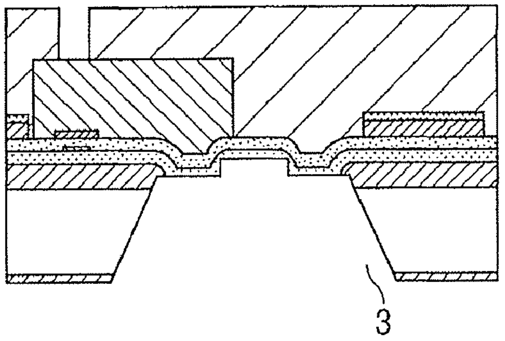
Figure 6G:
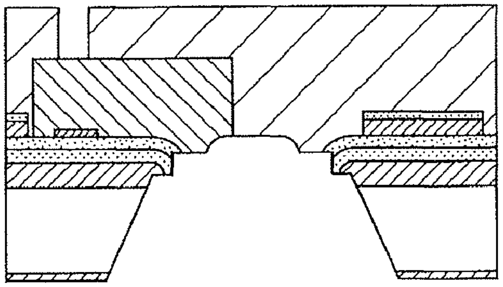
Figure 6H:
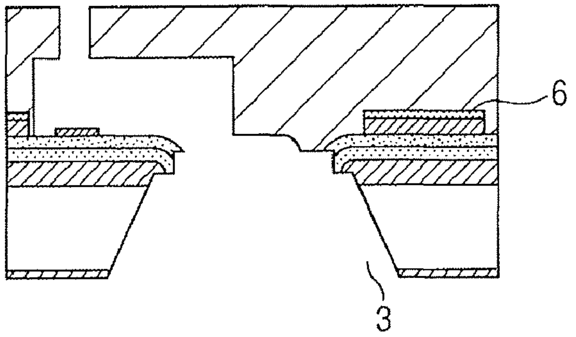
Figure 7:
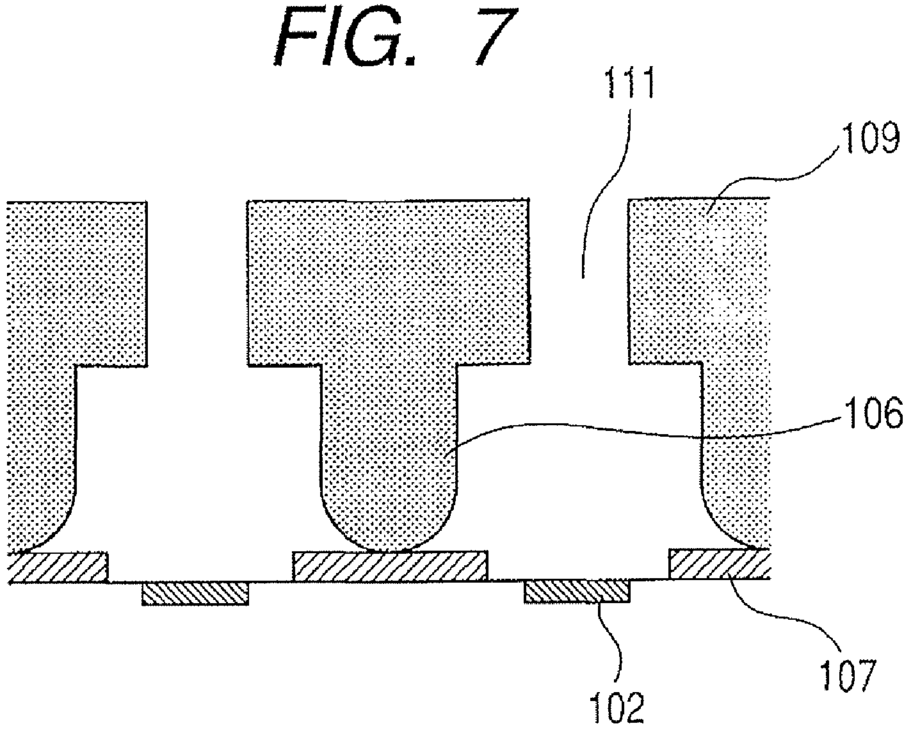
FIG. 7 is a schematic cross-sectional view for describing the present invention.
Figure 8:
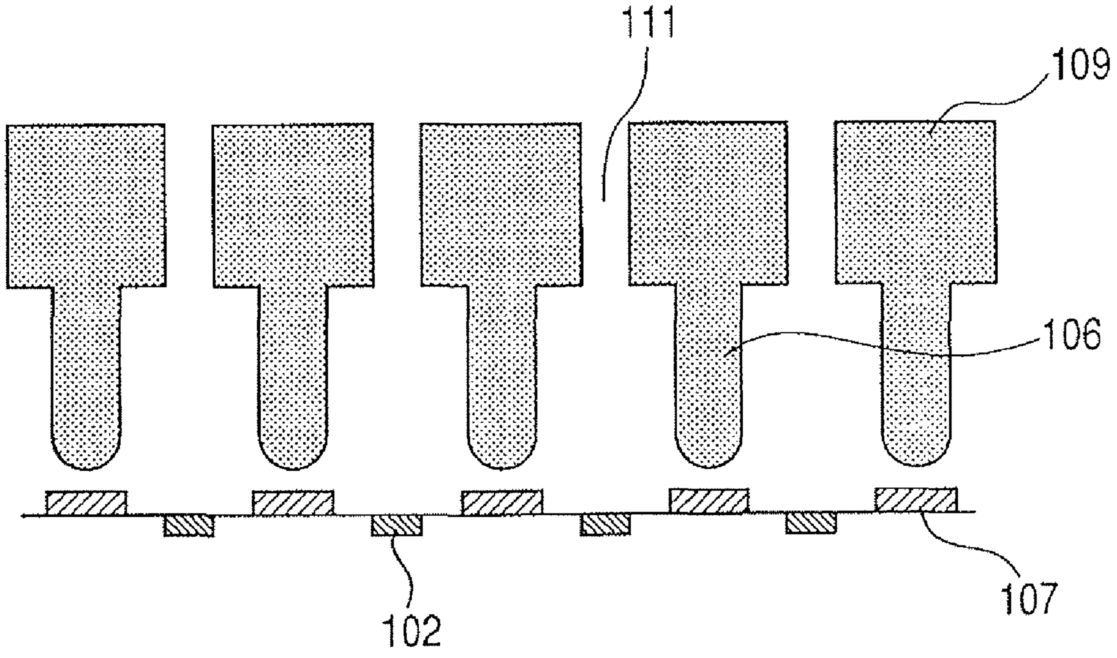
FIG. 8 is a schematic cross-sectional view for describing the present invention.

Then, as illustrated in FIG. 6C, patterning of the adhesion layer 5 is executed, utilizing the patterned first flow path forming member 6 as a mask. The patterning of the adhesion layer 5 can be executed for example by a drying etching. In the case that the adhesion layer 5 is formed by a photosensitive polyether amide resin, it can be executed by a photolithographic technology. Thus the adhesion layer 5 is removed, leaving a portion covered by the first flow path forming member 6, so that the remaining adhesion layer 5 has a width and a length same as those of the first flow path forming member 6.

Subsequent steps illustrated in FIGS. 6D to 6H are same as those of the first exemplary embodiment, illustrated in FIGS. 3D to 3H.

In the first exemplary embodiment, a coating and a patterning of a positive resist are necessary for patterning the adhesion layer 5. In contrast, in the present exemplary embodiment, the adhesion layer 5 is patterned utilizing the first flow path forming member 6 formed thereon as a mask, so that the coating of the positive resist for patterning the adhesion layer 5 can be dispensed with and the process can be correspondingly simplified. Also the first flow path forming member 6, at the formation, need not be aligned with the adhesion layer 5, so that the operation for this purpose can be dispensed with.

Third Exemplary Embodiment

A third exemplary embodiment of the present invention will be described with reference to FIGS. 9A to 9H. The third exemplary embodiment of the present invention provides a construction in which the adhesive power between the flow path forming member and the substrate is further improved.

Figure 9A:
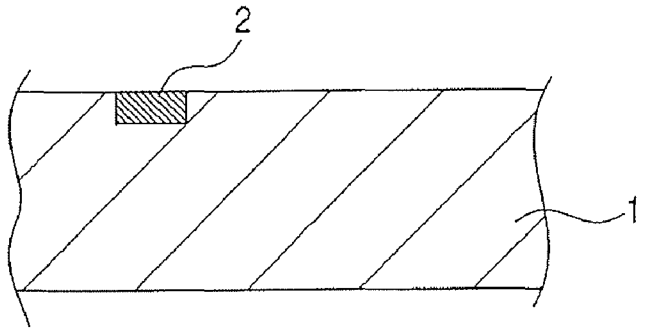
FIGS. 9A, 9B, 9C, 9D, 9E, 9F, 9G and 9H are schematic cross-sectional views illustrating an example of the producing method for ink jet head of the present invention.
Figure 9B:
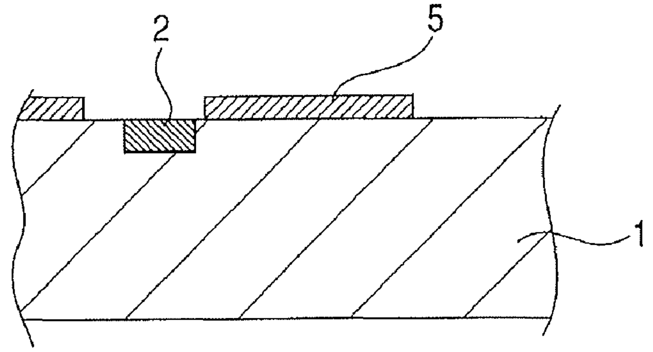
Figure 9C:
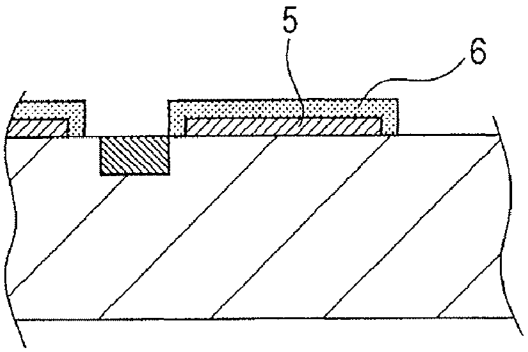
Figure 9D:
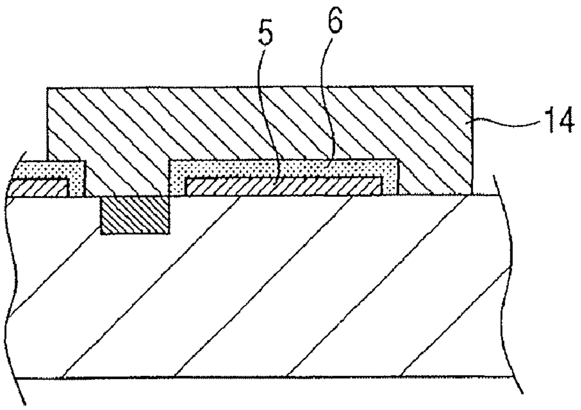
Figure 9E:
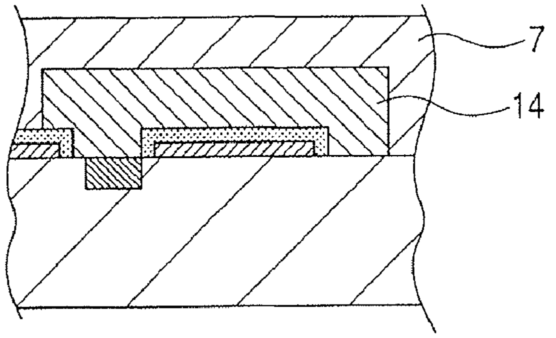
Figure 9F:
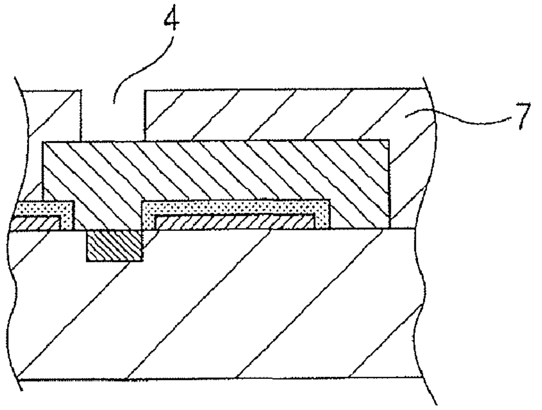
Figure 9G:
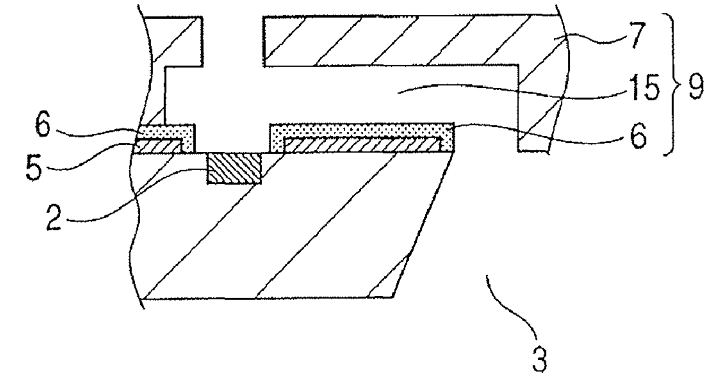
Figure 9H:
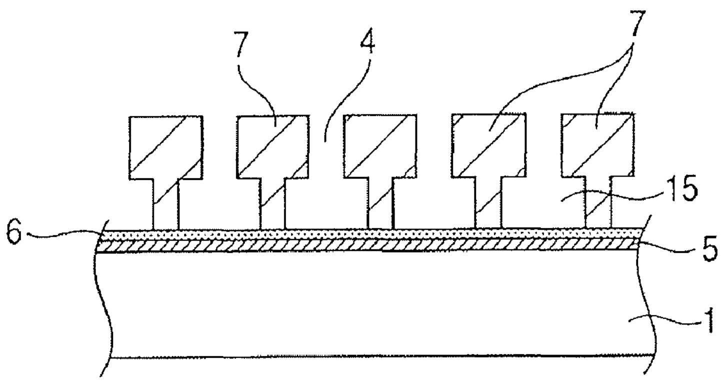

FIGS. 9A to 9H are partial cross-sectional view of the ink jet head in the third exemplary embodiment of the present invention, in which FIGS. 9A to 9G correspond to a cross section along a line B-B in FIG. 1, and FIG. 9H corresponds to a cross section along a line C-C in FIG. 1.

In the case of the ink jet head of the present exemplary embodiment, as illustrated in FIGS. 9G and 9H, within a range on the substrate from the supply opening 3 to the energy generating element 1, a flow path forming member is provided also in a position opposed to the face bearing the discharge port 4 (hereinafter called a bottom portion of the flow path). In the illustrated form, the first flow path forming member 6 is so formed as to cover the adhesion layer 5.

The producing method for the ink jet head of the present exemplary embodiment will be described with reference to FIGS. 9A to 9H.

A substrate 1 bearing energy generating element 2 is prepared as illustrated in FIG. 9A, and then an adhesion layer 5 is formed on the substrate 1 as illustrated in FIG. 9B. In this case, the adhesion layer 5 is formed, on the substrate, within a portion constituting the bottom portion of the flow path, and in a range from the supply opening 3 to the energy generating element 1. The material constituting the adhesion layer 5 may be suitably selected according to the materials constituting the first and second flow path forming members. The present exemplary embodiment describes a case of utilizing polyether amide, but the present invention is not limited to such case.

Then, as illustrated in FIG. 9C, a first flow path forming member 6 is formed in the same manner as described with reference to FIG. 3C. In this operation, the first flow path forming member is formed within a portion constituting the bottom portion of the flow path, and in a range from the supply opening 3 to the energy generating element 1. Stated differently, the first flow path forming member 6 is formed in a position present between the side walls of the flow path 15. In this operation, the first flow path forming member 6 may be so formed as to completely cover the adhesion layer 5, but the present invention is not limited to such construction. Complete covering means that the adhesion layer 5 is shielded from the flow path 15.

The subsequent steps illustrated in FIGS. 9D to 9G are executed as described in the first exemplary embodiment, thereby finally completing an ink jet head as illustrated in FIG. 9G.

The ink jet head of the present exemplary embodiment, having the first flow path forming member 6 in the bottom portion of the flow path, has an increased contact area between the substrate 1 and the first flow path forming member 6, thereby improving the adhesivity between the substrate 1 and the flow path forming member. The first flow path forming member 6 provided in the bottom portion of the flow path may be made continuous with portions serving as side walls within the first flow path forming member, or may be independent therefrom. Also, if necessary, an adhesion layer 5 may be provided between the first flow path forming member 6 formed on the bottom portion of the flow path and the substrate 1. Such construction increases the contact area between the substrate 1 and the adhesion layer 5, and simultaneously increases the contact area between the adhesion layer 5 and the first flow path forming member 6. Stated differently, the area of the adhesion layer 5, that can be present between the substrate 1 and the first flow path forming member 6, can be increased. The present invention enables to increase the adhesivity between the substrate 1 and the flow path forming members 6, 7, thereby providing an ink jet head of a high reliability in which the flow path forming members are less liable to be peeled off. Also, the first flow path forming member 6 is preferably so formed as to completely cover the adhesion layer 5 (the adhesion layer 5 and the flow path being insulated by the first flow path forming member 6). In such construction, the adhesion layer 5 does not come in contact with the solvent employed in the manufacture or the ink, thus increasing the freedom in selection of the material constituting the adhesion layer 5.

Fourth Exemplary Embodiment

Now a fourth exemplary embodiment of the present invention will be described with reference to FIGS. 10A to 10D.

Figure 10A:
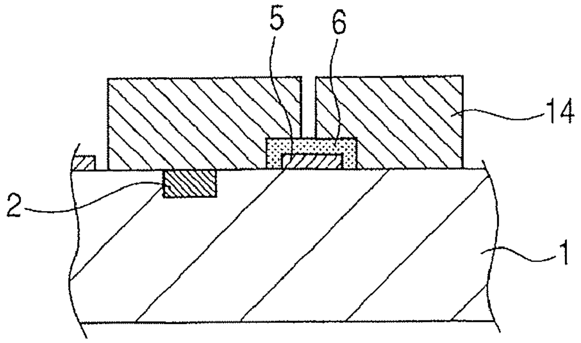
FIGS. 10A, 10B, 10C and 10D are schematic cross-sectional views illustrating an example of the producing method for ink jet head of the present invention.
Figure 10B:
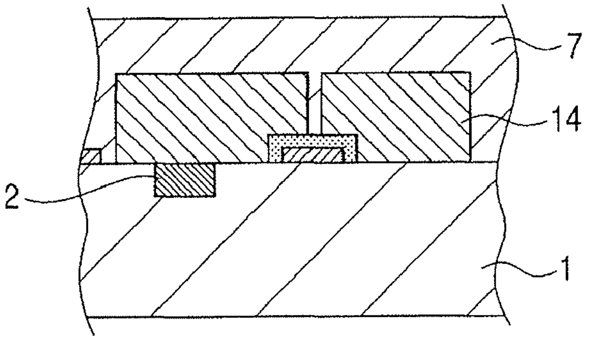
Figure 10C:
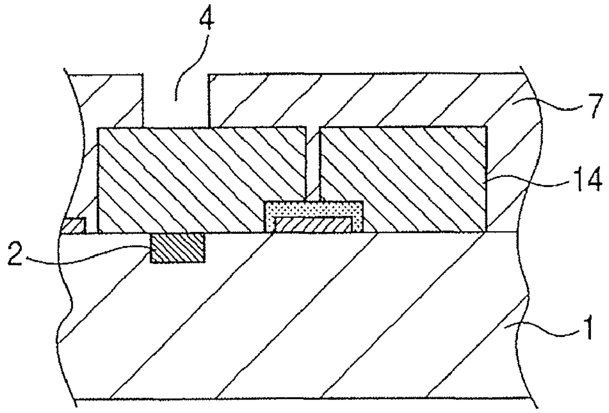

FIGS. 10A to 10D are partial cross-sectional views for describing an ink jet head of the fourth exemplary embodiment of the present invention, corresponding to a cross section along a line B-B in FIG. 1. Also FIG. 11 is a see-through view of the ink jet head of the fourth exemplary embodiment of the present invention, seen in a direction from the discharge port toward the substrate.

Figure 10D:
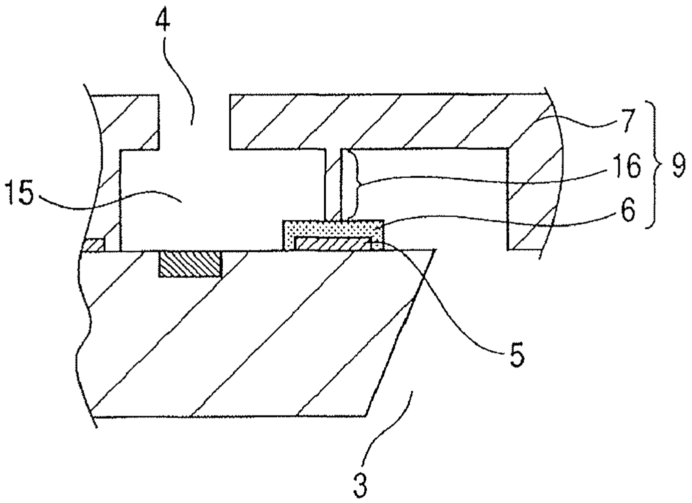
Figure 11:
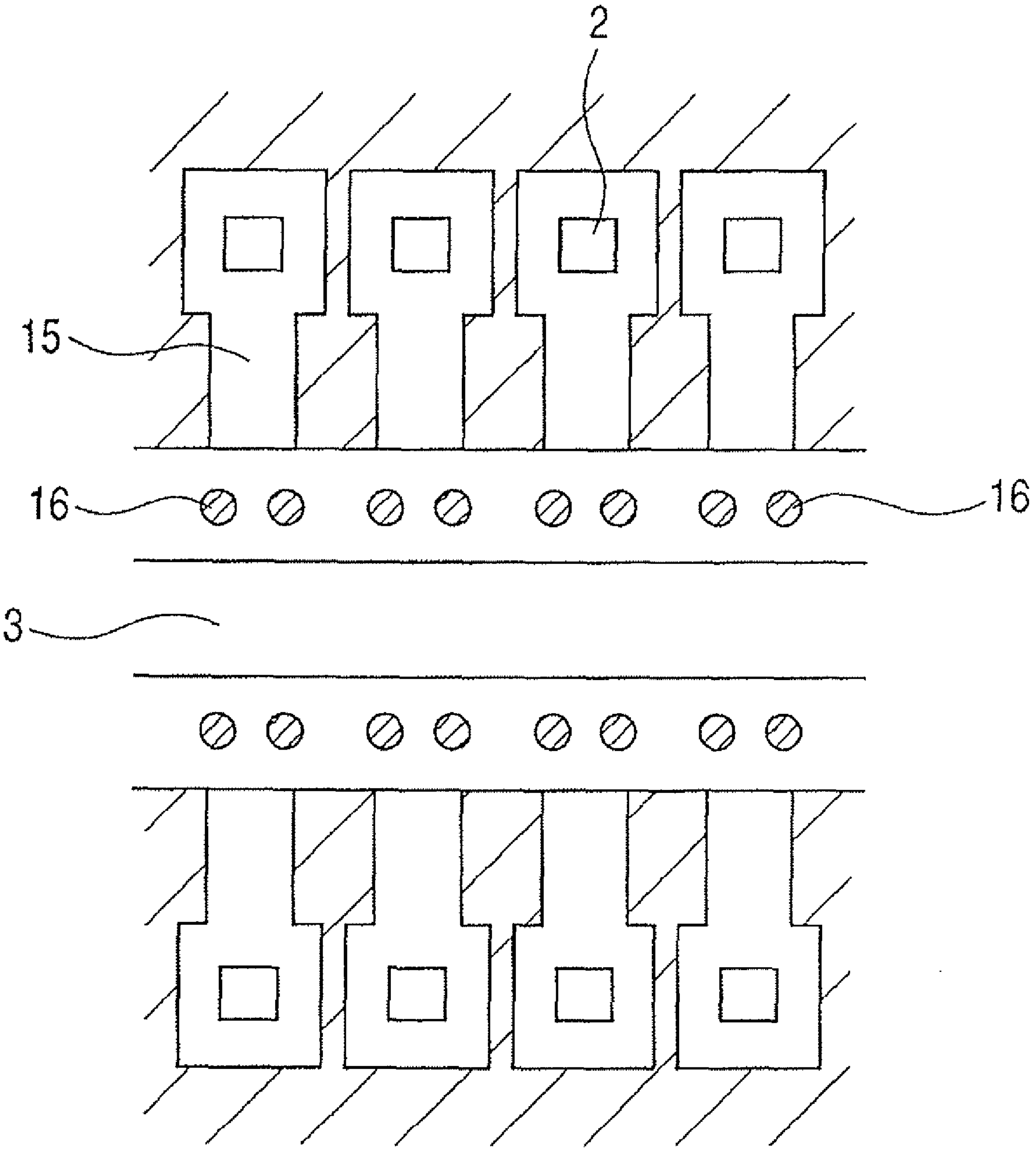
FIG. 11 is a see-through plan view illustrating the structure of an example of the ink jet head of the present invention.

In making the ink jet head of the present exemplary embodiment, as illustrated in FIG. 10D, a first flow path forming member 6 is formed on the bottom portion of the flow path 15, and a filter portion 16 is formed thereon. The filter portion is intended to suppress a foreign substance, introduced into the flow path, from being guided to the discharge port. Also in the present embodiment, an adhesion layer 5 may be provided between the first flow path forming member 6 and the substrate 1, as described above.

Now the producing method for the ink jet head of the present exemplary embodiment will be described with reference to FIGS. 10A to 10D.

At first, steps illustrated in FIGS. 9A to 9C are executed in the same manner as in the third exemplary embodiment.

Then, a pattern 14 as a mold for the flow path 15 is formed as illustrated in FIG. 10A. In this operation, a part of the first flow path forming member 6 is covered by the mold while the first flow path forming member 6 is exposed in a remaining portion.

Then, a second flow path forming member 7 is formed as illustrated in FIG. 10B. Through this operation, in the second flow path forming member 7, a filter portion 16 comes into contact with the first flow path forming member 6.

Then, a discharge port 4 is formed in the second flow path forming member 7 as illustrated in FIG. 10C, and thereafter the process is conducted in the same manner as in the third exemplary embodiment to complete an ink jet head as illustrated in FIG. 10D.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-123736, filed Apr. 27, 2006, 2006-160069, filed Jun. 8, 2006, and 2006-166002 filed Jun. 15, 2006, which are hereby incorporated by reference herein in their entirety.

What is claimed is:

1. A producing method for an ink jet head including plural discharge ports for discharging ink and plural flow paths communicating with the discharge ports, the producing method comprising:

forming a first flow path forming member of photosensitive resin in a portion constituting a flow path side wall, which constitutes at least a partitioning portion between plural flow paths on a substrate and functions as a wall of at least one of the flow paths;

forming a pattern as a mold for the at least one flow path, wherein the pattern is formed over the substrate and a first portion of the first flow path forming member that functions as the wall of the flow path, and a second portion of the first flow path forming member is not covered with the pattern;

forming a second flow path forming member of photosensitive resin on the first flow path forming member and the pattern, wherein the second flow path forming member functions as a wall of the at least one flow path, the second flow path forming member being formed of a material corresponding to the first flow path forming member;

forming the discharge port in the second flow path forming member; and forming the at least one flow path by removing the pattern.

2. A producing method for ink jet head according to claim 1, wherein the second flow path forming member contacts the second portion of the first flow path forming member.

3. A producing method for ink jet head according to claim 2, wherein the first flow path forming member is formed also in a position present between side walls forming the at least one flow path.

4. A producing method for ink jet head according to claim 1, wherein a pattern of an adhesion layer is formed on the substrate, prior to formation of the first flow path forming member.

5. A producing method for ink jet head according to claim 4, wherein the first flow path forming member is so formed as to completely cover the adhesion layer.

6. A producing method for ink jet head according to claim 1, wherein the first flow path forming member and the second flow path forming member are formed of the same kind of photosensitive resin.

7. A producing method for ink jet head according to claim 1, wherein the first flow path forming member and the second flow path forming member are formed by a cured substance of an epoxy resin.

8. A producing method for ink jet head according to claim 1, wherein the pattern includes a positive photosensitive resin.

9. A producing method for ink jet head according to claim 1, wherein the discharge port is formed in a position opposed to an energy generating element for generating energy to be used for ink discharge.

10. A producing method for ink jet head according to claim 1, wherein the first flow path forming member and the second flow path forming member come in direct contact with each other.

* * * * *